United States Patent [19]

Overhoff

[11] 4,262,203

[45] Apr. 14, 1981

[54] ALPHA PARTICLE MONITOR

[76] Inventor: Mario W. Overhoff, 1036 Paxton Ave., Cincinnati, Ohio 45208

[21] Appl. No.: 8,487

[22] Filed: Feb. 2, 1979

[51] Int. Cl.³ .............................................. G01T 1/18
[52] U.S. Cl. .................................... 250/374; 250/380
[58] Field of Search ............... 250/374, 379, 380, 383, 250/384

[56] References Cited

U.S. PATENT DOCUMENTS

| | | | |
|---|---|---|---|
| 3,093,738 | 6/1963 | Mann et al. | 250/374 |
| 3,204,099 | 8/1965 | Ludlum | 250/379 |
| 3,426,232 | 2/1969 | Molitor | 250/379 |
| 3,959,653 | 5/1976 | Lee et al. | 250/374 |

*Primary Examiner*—Davis L. Willis
*Assistant Examiner*—Janice A. Howell
*Attorney, Agent, or Firm*—Wood, Herron & Evans

[57] ABSTRACT

An alpha particle monitor is disclosed which includes a flow-through linear ionization chamber with means to pass therethrough gas-borne radioactive matter exhibiting alpha decay, such as, radon gas, air-borne plutonium or uranium dust, etc., and an amplifier sensitive to charges on the order of $10^{-14}$ coulombs associated with an alpha emission event. In a preferred form, the amplifier includes a solid state operational amplifier having a stray feedback capacitance sufficiently low to provide, in response to an alpha decay event, an output pulse with a measurable voltage amplitude, e.g., 0.1–1.0 volts, and a feedback resistance sufficiently high to provide the amplifier with a time constant such that the output pulse produced in response to an alpha emission event has a width sufficient to facilitate detection in the presence of noise.

Circuitry is also included for measuring emissions which have energies significantly lower than alpha particles, such as beta or gamma radiation, and/or energies of lower specific ionization than alpha particles. The circuitry can measure such low energy and/or low specific ionization emissions either alone or simultaneously with the measurement of alpha emissions.

15 Claims, 5 Drawing Figures

ALPHA PARTICLE MONITOR

This invention relates to alpha monitors, and more particularly to apparatus for detecting and measuring gas-borne radioactive matter which emits alpha particles, such as radon gas, air-borne plutonium and/or uranium dust, and the like.

Alpha particles are produced by the decay or disintegration of a number of different radioactive materials. Principal among these is radon gas, which has a half-life of 3.82 days and upon decay forms polonium-218. One principal method, therefore, of detecting radon gs is by monitoring the alpha particles produced when radon decays. Radon monitoring has a variety of useful purposes. For example, it permits the environment to be monitored for personnel health and safety purposes with respect to both naturally occurring sources of radiation such as present in uranium mines, and man-made radiation hazards such as occur in nuclear power generation and weaponry, medical and occupational radiation, and the like. Radon monitoring is also useful in prospecting for radioactive materials such as uranium.

As is apparent from the foregoing, in addition to monitoring radon by detecting and measuring alpha particle emission associated with radon disintegration, the presence of other materials emitting alpha particles can be monitored, including radioisotopes, e.g., plutonium, and gas-borne alpha-emitting particles, e.g., air-borne uranium dust.

Heretofore, a typical approach to monitoring alpha-emitting radon gas, as well as gas-borne alpha-emitting particles such as uranium dust, has been to use a proportional type ionization chamber. In a proportional ionization chamber, current amplification within the chamber occurs by reason of avalanching electrons induced by the high voltages applied to the chamber. As a result, there is a tendency to produce arcing within the chamber, particularly when the alpha-emitting particles are suspended in an electronegative gas, such as air. To minimize arcing, the air is usually diluted with an electropositive gas which does not tend to ionize, such as argon. Dilution is undesirable since it substantially reduces the concentration of alpha-emitting matter which it is desired to monitor. In fact, typically the dilution, and hence reduction in concentration of the alpha-emitting matter, is by a factor of 10. Another undesirable characteristic of proportional ionization chambers is that they are deleteriously affected by changes in humidity and by variations in the applied chamber voltage.

Accordingly, it has been an objective of this invention to provide a monitor for detecting and measuring gas-borne alpha-emitting matter which obviates the problems associated with monitoring methods utilizing proportional type ionization chambers. This objective has been accomplished in accordance with the principles of this invention by utilizing, in combination, a flow-through linear ionization chamber with means to pass therethrough gas-borne radioactive matter exhibiting alpha decay, and an extremely sensitive amplifier in the form of a solid state operational amplifier having a stray feedback capacitance sufficiently low to provide an output pulse with a measurable amplitude, of e.g., 0.1-1.0 volts, in response to collecting in the ionization chamber a change associated with an alpha particle decay event of approximately $10^{-14}$ coulombs, and a feedback resistance sufficiently large to provide the amplifier with a time constant which produces a pulse at the amplifier output terminal having a duration sufficiently large to facilitate discrimination in the presence of noise.

An advantage of this invention, particularly by virtue of utilization of a linear ionization chamber, is that dilution with an electropositive gas is not required. Since there is no dilution, the response of the monitor of this invention is at least ten times more rapid. In addition, the monitor of this invention remains accurately calibrated for humidities from 0% to almost 100%. Finally, variations in the voltage applied to the ionization chamber produce negligible changes in the waveform of the pulse produced by an alpha decay event, thereby assuring enhanced reliability in the measurement of alpha particles.

In accordance with a preferred embodiment of the invention, the solid state operational amplifier has a hydrophobically coated feedback resistor exhibiting a resistance greater than approximately $10^{11}$ ohms. The hydrophobic coating hermetically seals the resistor in a manner such that moisture is not likely to collect on the suface thereof and decrease the resistance of the feedback resistor under adverse environmental conditions. Preferably, the feedback resistor is not encased in a conductive housing, thereby minimizing stray feedback capacitance.

Also included in the preferred embodiment of the invention is a high input impedance transistor, which is connected in the input circuit of the operational amplifier. The transistor is provided with a hydrophobic coating to reduce the input bias current, input offset current, and noise current to a collective value at least below $10^{-16}$ amperes. With these currents collectively limited in value as indicated, charges collected by the ionization chamber on the order of $10^{-14}$ coulombs, associated with the decay of alpha particles, can be reliably sensed.

In accordance with a further aspect of the invention, a delay line having a delay on the order of 1-10 ms is provided which is responsive to the output of the operational amplifier, and the delayed amplifier output as well as the undelayed amplifier output are input to a differential comparator. A single shot having an amplitude threshold correlated to approximately 25% of the amplitude of a pulse output from the amplifier due to an alpha decay event is connected to the output of the comparator. With the foregoing, a count efficiency, using a one liter chamber, of approximately 90% is obtained. This is due to the pulse discriminating nature of the circuitry which, in effect, senses the rise time of signals output from the amplifier and recognizes only signals having a fast rise time typical of pulses. The pulse recognition circuitry of this invention is particularly effective in counting partially overlapped pulses occurring in rapid succession typical of a condition known as "pulse pile-up".

These and other features and objectives of the invention will be more readily apparent from a detailed description thereof taken in conjunction with the drawings in which.

Figure 3:
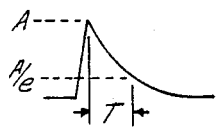
Figure 4A:
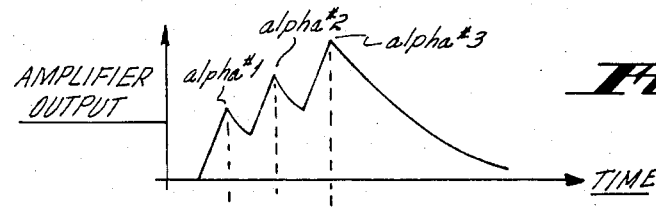
Figure 4B:
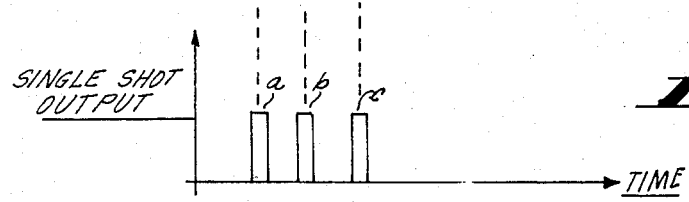

FIG. 3 is a schematic circuit diagram of a preferred form of pulse recognition circuit useful in the alpha monitor of this invention; and FIGS. 4a and 4b are plots of amplitude versus time correlating output signals from the pulse recognition circuit with input signals from the operational amplifier, for the purpose of demonstrating the ability of the monitor of this invention to recognize overlapped pulses associated with a condition known as "pulse pile-up".

Figure 1:
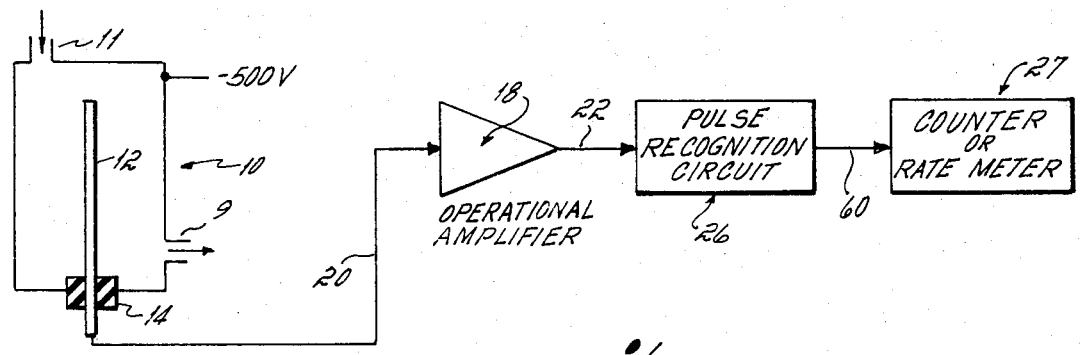
FIG. 1 is a schematic diagram, partially in block circuit format, of the alpha monitor of this invention.
Figure 2:
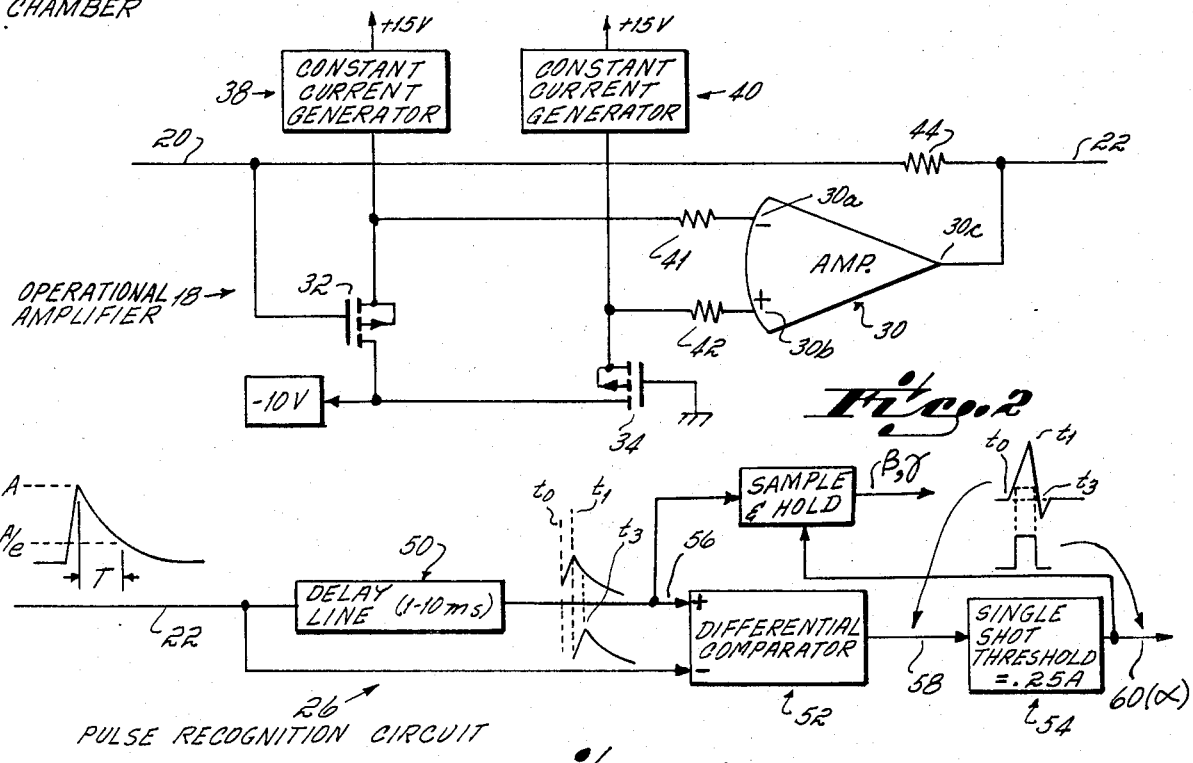
FIG. 2 is a schematic circuit diagram of a preferred form of operational amplifier useful with a linear ion chamber in the alpha monitor of this invention.

The alpha monitor of this invention, as shown schematically in FIG. 1, includes a linear flow-through ionization chamber 10 having an inlet 11 and an outlet 9 for passing gas containing alpha-emitting matter through the chamber. A suitable pump (not shown) may be associated with the inlet or outlet for inducing a flow of the gas being monitored through the chamber 10. The gas flowing through the chamber 10 may be radon gas, air containing alpha-emitting particles such as uranium dust, etc. If the radon content of water is being monitored, air can be bubbled through the water to displace the radon and the displaced radon passed through the chamber 10 for monitoring purposes.

The ionization chamber 10, which in a preferred embodiment is a one liter stainless steel cylindrical container, has a central opening at one end through which a collector electrode 12 is mounted. A suitable electrical insulator 14 separates the collecting electrode 12 and the cylindrical container 10. An electrostatic potential of 500 volts is maintained between the collecting electrode 12 and the cylindrical container 10 of the ionization chamber.

When gas-borne alpha-emitting matter is passed through the linear ionization chamber 10, emitted alpha particles collide with gas molecules within the chamber, causing ionization thereof. Negative ions are collected by the collector electrode 12. A charge of approximately $10^{-14}$ coulombs is associated with each alpha decay event.

The alpha monitor of this invention also includes an operational amplifier circuit 18 having its input connected to the collector electrode 12 of the linear ionization chamber 10 via line 20. The operational amplifier 18 provides on the output line 22 a pulse having an amplitude of approximately 0.1–1.0 volts for each alpha decay event occurring within the ionization chamber 10 sensed by the collector electrode 12. The width of the pulse output from the operational amplifier 18 on line 22 is sufficient to permit it to be recognized, or counted, in the presence of noise by suitable signal processing circuitry to be described hereafter.

To facilitate recognition of pulses output from the operational amplifier 18 on line 22 associated with alpha decay events occurring within the ionization chamber 10, a pulse recognition circuit 26 is provided. The pulse recognition circuit 26 distinguishes between pulses output from the operational amplifier 18 associated with alpha decay events occurring within the linear ionization chamber 10 and electrical noise. Electrical noise may be produced by transistors, resistors, and the like, as well as by seismic events such as physical vibration of the linear ionization chamber.

A suitable pulse counter or pulse rate meter 27 is provided. The pulse counter or rate meter 27 provides, in any suitable form such as a printout or digital display, a pulse count or pulse rate indication of the alpha decay events occurring within the linear ionization chamber 10.

The operational amplifier 18, in a preferred form, includes a solid state amplifier 30 having negative and positive input terminals 30a and 30b and an output terminal 30c connected to line 22. The amplifier 30 may be obtained from any suitable source such as National Semiconductor, RCA, Texas Instruments or the like. In practice, amplifiers designated LN-316 and LS-355 available from National Semiconductor have been found suitable. Such amplifiers exhibit high impedance and good stability.

A high impedance transistor 32, preferably a MOSFET, is connected in the input circuit of the operational amplifier 18 between the linear ionization chamber output line 20 and the negative input terminal 30a of the amplifier 30. Similarly, a transistor 34, also preferably of the MOSFET type, is connected between the positive terminal 30b of the amplifier 30 and common terminal 36. The transistors 32 and 34 are connected to current generators 38 and 40, respectively. Coupling resistors 41 and 42 are interconnected between amplifier terminals 30a and 30b and the source electrodes of their respectively associated transistors 32 and 34. A feedback resistor 44 is interconnected between the output terminal 30c of the amplifier 30 and the output line 20 of the linear ionization chamber 10.

A feedback resistor 44 having minimal stray feedback capacitance is selected such that the voltage output at terminal 30c from the operational amplifier circuit 18 as a result of an alpha decay event, which provides a charge of $10^{-14}$ coulombs, will produce an output signal in the form of a pulse having a measurable voltage in the approximate range of 0.1–1.0 volts. If the stray feedback capacitance is too large, a pulse-type output characterized by rapid rise time, will not be produced. The amplitude of the pulse produced at the output of the operational amplifier 18 in response to an alpha decay event occurring in the linear ionization chamber 10 is related by the equation, $V = Q/C$, where V is the amplitude of the output voltage, Q is the charge associated with an alpha decay event, and C is the capacitance between amplifier input line 20 and output line 22 which primarily is in the form of stray feedback capacitance attributable to the feedback resistor 44.

The resistance of the feedback resistor 44 is selected such that, in combination with the capacitance between the operational amplifier input line 20 and output line 22, represented primarily by the stray feedback capacitance of feedback resistor 44, the time constant of the operational amplifier 18 is such that the output pulse from the operational amplifier associated with an alpha decay event in the linear ionization chamber 10 has a pulse width which facilitates recognition by the pulse recognition circuit 24 in the presence of electrical noise. The time constant T, of the operational amplifier 18, is the time it takes the amplitude of the output signal on line 22 to drop to 1/e of its maximum value when provided at its input on line 20 with a pulse-type signal exhibiting negligible rise time. The time constant T of the operational amplifier circuit 18 is related by the equation, $T = RC$, where R and C are the resistance and capacitance, respectively, between operational amplifier input line 20 and output line 22. If the resistance of the feedback resistor 44 is insufficient, the pulse output from the operational amplifier 18 in response to an alpha decay event will be in the form of a voltage spike which cannot be counted or recognized in the presence of electrical noise by the pulse recognition circuit 26. If the feedback resistor has a resistance which is too large, the operational amplifier 18 will not be able to provide discrete pulses for closely spaced alpha decay events occurring in the ionization chamber 10. In practice, it has been found that the feedback resistor 44 should have a resistance of approximately $10^{11}$ ohms and a stray capacitance of approximately $10^{-13}$ pico farads or less. Resistors commercially available from Welwin Canada, Ltd., London, Ontario designated MH51, when provided with a hydrophobic coating to minimize the accumulation of surface moisture, such as ceresin wax, tetrafluoroethylene (Teflon), etc., have been found to be very satisfactory. Such resistors, since they are not enclosed within a vacuum sealed glass envelope as is often done to provide an hermetical seal, exhibit minimal stray capacitance, which as indicated previously, is desirable in this particular invention.

The transistor 32 connected in the operational amplifier input circuit between the output line 20 of the linear ionization chamber 10 and the amplifier input terminal 30a is also provided with a hydrophobic coating. The purpose of such a coating is to reduce the input bias current, input offset current, and noise of transistor 32 to a collective level of at least approximately $10^{-16}$ amperes or less as is necessary if charges of $10^{-14}$ coulombs associated with an alpha decay event are to be measured. The input offset current is the current measured on the gate terminal of the transistor under normal operating conditions. Noise current is the component of the transistor gate current attributable to nonsignal sources.

The "input bias current" of the transistor 32 is the current leakage into the gate electrode from either the drain or source electrodes. In practice, it has been found that the input bias current of commercially available MOSFET transistors, which often have an input bias current of $10^{-13}$ amperes as provided by the manufacturer, can be reduced by a factor of one hundred by removing the transistor casing, cleaning the transistor to remove dirt, grease, oil, etc., and thereafter coating it with a hydrophobic coating such as ceresin wax, Teflon, etc. If ceresin wax is used, it is desirable after coating with the ceresin wax to immediately place the coated transistor in a cleaned housing otherwise the wax coating will tend to pick up lint, dirt, etc. degrading its input bias current. If the transistor has been coated with Teflon, it is not necessary to encase the transistor in a clean housing since the Teflon has a "no-stick" surface to which dirt and lint do not adhere.

The output line 22 of the operational amplifier 18 is input to the pulse recognition circuit 26. As shown in FIG. 3, the pulse recognition circuit 26 includes a delay line 50 connected to the output line 22 of the operational amplifier 18, a differential comparator or amplifier 52, and a single shot 54. The delayed output of the operational amplifier 18 present on delay line output line 56 and the undelayed output of the charge amplifier on line 22 are input to the positive and negative terminals of a differential comparator 52 which provides on its output line 58 a signal correlated to the difference between the delayed and undelayed outputs of the charge amplifier. The single shot 54 has a threshold equal to approximately 25% of the amplitude of a pulse output from the charge amplifier associated with an alpha decay event in the linear ionization chamber, and is operative to provide on its output line 60 a pulse corresponding to each pulse output from the operational amplifier 18 associated with an alpha decay event.

In practice, it has been found that a delay of 1–10 ms for delay line 50 is desirable when the operational amplifier 18 has, as is desirable in this invention, a time constant of the order of 10–50 ms. A delay line 50 having a delay of the order indicated, in combination with the differential comparator 52 and single shot 54, provides high discrimination for signals having rapid rise times, such as pulses, and can provide discrete pulses to the counter or rate meter 27 for each output pulse from the operational amplifier 18 notwithstanding that the pulses output from the amplifier are closely spaced in time coresponding to rapidly successively occurring alpha decay events in the linear ionization chamber 10. Fig. 4a shows the overlapped pulse output from the operational amplifier 18 on line 22 which is present when three rapidly occurring alpha decay events occur in ionization chamber 10. The overlapped pulses associated with these three events are designated "alpha 1", "alpha 2" and "alpha 3". FIG. 4b shows the pulses "a", "b" and "c" output from the single shot 54 on line 60 produced by the overlapped amplifier output signals "alpha 1", "alpha 2" and "alpha 3" associated with the successive rapidly occurring alpha decay events. Significantly, the three pulses "a", "b" and "c" produced by the single shot 54 at its output line 60 are discrete, notwithstanding that the signals output from the charge amplifier 18 on line 22, which are produced in response to the three rapidly occurring alpha events occurring in the linear ionization chamber 10, are overlapped.

FIG. 3 shows the waveforms of the inputs to the differential comparator 52 for a delayed and undelayed signal output from the operational amplifier 18 on line 22 associated with a single alpha decay event in an ionization chamber 10. With input waveforms of the type shown, the comparator 52 produces an output signal which, when input to the single shot 54, produces a pulse on line 60.

The monitor of this invention has been described in connection with sensing alpha particles. It can also be used to measure "weak" radiation, i.e., radiation which is significantly less energetic than alpha emission, such as beta, gamma, etc., or energy of lower specific ionization than alpha emission. It can measure such weak energies either alone or simultaneously with measurements of alpha emission. The steady d.c. level of the operational amplifier output current on line 20 is related to weak radiation in chamber 10, while the pulses on line 20 are related to the alpha emission. By separating these two types of signals, measurement of either or both types of radiation can be made. For example, one way of separating the weak energy signals from the alpha pulses is to connect the input of a sample and hold circuit to delay line output 56, and gate the sample and hold circuit with the pulses output from the single shot 54 on line 60. When this is done, the output of the sample and hold is related to the average emission of radiations significantly less energetic than alpha emissions, while the pulse rate on single shot output line is related to alpha particle emission level.

What is claimed is:

1. Apparatus for monitoring gas-borne radioactive matter exhibiting alpha decay in the presence of less energetic ionizing radiation, comprising:

a flow-through linear ion chamber having an outer electrode enclosing an inner collector electrode between which an electrostatic potential is maintained of a magnitude insufficient to produce charge amplification avalanching within said chamber, said chamber including input and output gas ports to facilitate flow therethrough of a gas to be monitored bearing radioactive matter exhibiting alpha decay in the presence of less energetic ionizing radiation, and an amplifier connected to said collector electrode, said amplifier having insignificant feedback capacitance to thereby substantially eliminate electrical integration of the input thereto from said ion chamber collector electrode, said amplifier having a time constant for providing, in response to collection by said collector electrode of an electrical charge of approximately $10^{-14}$ coulombs associated with an alpha decay event, an output pulse having a width sufficient to be discriminated in the presence of noise.

2. The apparatus of claim 1 further including an autocorrelation detector comprising:

a delay means connected to the output of said amplifier for providing at the output of said delay line a replica of the input thereto delayed by approximately 1-10 ms, and a differential comparator having its inputs connected to the output of said delay line and the output of said amplifier for providing an output having an amplitude correlated to the difference between the amplitudes of the signals input to said differential comparator, a single shot connected to the output of said differential comparator, said differential comparator having a threshold set to equal approximately 25% of the amplitude of a pulse output from said amplifier associated with an alpha decay event, for providing discrete output signals in response to overlapped pulses output from said amplifier corresponding to rapidly successively occurring alpha decay events, whereby "piled-up" overlapping pulses associated with rapidly successively occurring alpha decay events are resolved using autocorrelation.

3. The apparatus of claim 2 wherein said time constant is on the order of approximately 10-50 ms.

4. The apparatus of claim 1 wherein said amplifier includes:

a solid state operational amplifier circuit having an input terminal, an output terminal, a feedback resistance means connected between said terminals, said feedback resistance means exhibiting a resistance of at least approximately $10^{11}$ ohms, and a stray feedback capacitance below approximately $10^{-13}$ pico farads.

5. The apparatus of claim 4 wherein said feedback resistance means includes a feedback resistor having a hydrophobic coating, said resistor being free of an enclosure which contributes unstable shunt resistance and stray feedback capacitance exceeding approximately $10^{-13}$ pico farads.

6. The apparatus of claim 5 further including an input transistor connected in the input circuit of said operational amplifier circuit, said transistor having an input bias current input offset current, and noise current which collectively do not exceed approximately $10^{-16}$ amperes to enable sensing charges associated with individual alpha decay events of approximately $10^{-14}$ coulombs.

7. The apparatus of claim 6 wherein said transistor has a semiconductor body provided with a hydrophobic coating on the exterior body surface thereof to minimize the input bias current, input offset current, and noise current thereof.

8. The apparatus of claim 7 wherein said coating is of the low adhesion type to which foreign matter does not readily adhere, to thereby minimize electrical surface conductance.

9. The apparatus of claim 5 wherein said coating is of the low adhesion type to which foreign matter does not readily adhere to thereby minimize electrical surface conductance.

10. Apparatus for monitoring gas-borne radioactive matter emitting weak ionizing radiation substantially less energetic than alpha particles, comprising:

a flow-through linear ion chamber having an outer electrode enclosing an inner collector electrode between which an electrostatic potential is maintained of a magnitude insufficient to produce charge amplification avalanching within said chamber, said chamber including input and output gas ports to facilitate flow therethrough of a gas to be monitored bearing radioactive matter substantially less energetic than alpha particles, an operational amplifier circuit connected to said collector electrode for providing at its output a steady state signal related to the average level of said weak radiation, said operational amplifier circuit having (a) a feedback resistance of at least approximately $10^{11}$ ohms, (b) feedback capacitance, including stray feedback capacitance, below approximately $10^{-13}$ pico farads, to substantially eliminate electrical integration of the input to said amplifier from said ion chamber collector electrode, and (c) a time constant for providing, in response to collection by said collector electrode of an electrical charge of approximately $10^{-14}$ coulombs associated with an alpha decay event, an output pulse having a width sufficient to be discriminated in the presence of noise, and signal separation means connected to the output of said operational amplifier for separating said steady state signal associated with said weak radiation and said pulses associated withs said alpha emission, to enable measurement of said weak emission either alone or simultaneously with measurement of said alpha particle emission.

11. The apparatus of claim 10 wherein said feedback resistance includes a feedback resistor having a hydrophobic coating, said resistor being free of an enclosure which contributes unstable shunt resistance and stray feedback capacitance exceeding approximately $10^{-13}$ pico farads.

12. The apparatus of claim 10 further including an input transistor connected in the input circuit of said operational amplifier circuit, said transistor having an input bias current input offset current, and noise current which collectively do not exceed approximately $10^{-16}$ amperes to enable sensing charges associated with individual alpha decay events of approximately $10^{-14}$ coulombs.

13. The apparatus of claim 12 wherein said transistor has a semiconductor body provided with a hydrophobic coating on the exterior body surface thereof to minimize the input bias current, input offset current, and noise current thereof.

14. The apparatus of claim 11 wherein said coating is of the low adhesion type to which foreign matter does not readily adhere to thereby minimize electrical surface conductance.

15. The apparatus of claim 13 wherein said coating is of the low adhesion type to which foreign matter does not readily adhere to thereby minimize electrical surface conductance.

* * * * *